G. PURPLE.
Flour-Sifters.

No. 144,225.

Patented Nov. 4, 1873.

Witnesses.
Edw. W. Donn
Wm. H. Blodgett

Inventor:
Geo. Purple.
by his atty's.
Clayton & Co

UNITED STATES PATENT OFFICE.

GEORGE PURPLE, OF CAMERON, MISSOURI.

IMPROVEMENT IN FLOUR-SIFTERS.

Specification forming part of Letters Patent No. 144,225, dated November 4, 1873; application filed June 9, 1873.

*To all whom it may concern:*

Be it known that I, GEORGE PURPLE, of Cameron, in the county of Clinton and in the State of Missouri, have invented certain new and useful Improvements in Flour-Sifting Machinery; and I do hereby declare that the following is a full, clear, and exact description thereof, reference being had to the accompanying drawings and to the letters of reference marked thereon, in which—

Figure 1:
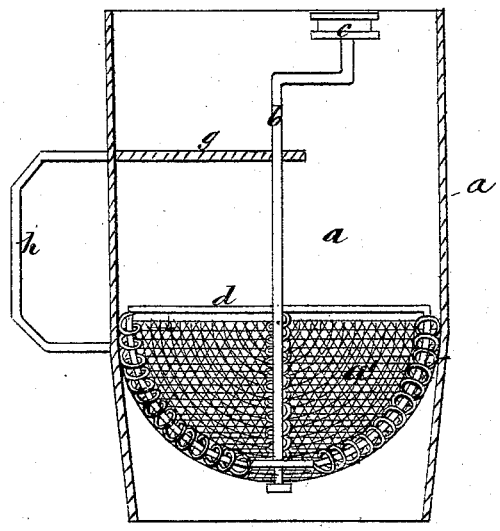
Figure 2:
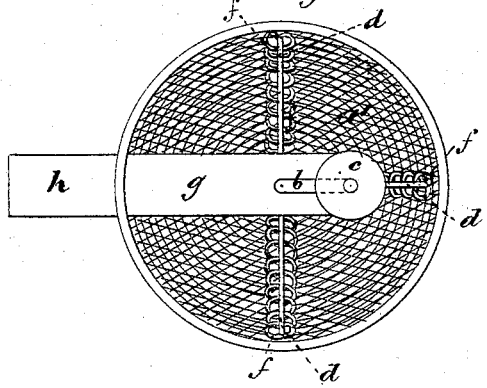

Figure 1 is a vertical section through my invention, and Fig. 2 a top-plan view.

The nature of my invention consists in the combination of revolving beaters (on the arms of these beaters are placed coiled wires, the beaters secured to an upright shaft) and a hemispherical sieve with a cylinder made conical at its lower end, all of which will be hereinafter more fully set forth.

To enable others skilled in the art to which my invention relates, I will proceed to describe its construction and operation.

In Fig. 1, $a$ is the cylinder, at the lower end of which it is made tapering or conical, so as to fit into different-sized vessels. This cone shape is about one-third the height of the cylinder. Within this part of the cylinder is securely placed a hemispherical-shaped sieve, $a'$, conical side up. $b$ is the vertical shaft, and $c$ handle for operating the beaters $d$, which are made in shape to fit the inner face of the sieve $a'$. A coiled wire, $f$, is placed over each arm of the beaters, that will readily yield to any pressure when said wire comes in contact with the sieve, when the beaters are made to revolve. The upright shaft $b$ rests in the center of the sieve $a'$, to which is attached a bearing for the end of the shaft to rest on. This bearing is soldered to the sieve. Said shaft, at or near its upper end, is held in its vertical position by brace $g$ attached to the cylinder. $h$ is a handle for convenience in holding the machine. The arms of beaters $d$ are attached to shaft $b$, and extend out to the walls of the cylinder, or nearly so, curved to fit to the concavity of the sieve $a'$, and have a coiled wire on each one, fitting against the sieve lightly.

In the operation of my invention, the cylinder is placed in the vessel to receive the flour as it is sifted. The flour to be sifted is put in the cylinder, which is held by handle $h$; the beaters are revolved, thereby agitating and forcing the flour through the sieve. Owing to the yielding of the coiled wires when brought in contact with the sieve in their rotation, the sieve will be but slightly rubbed, and will last much longer than if the arms of the beaters acted directly on the sieve.

Having thus described my invention, what I claim as new, and desire to secure by Letters Patent, is—

The beaters $d$, when provided with coiled wires $f$, in combination with shaft $b$, crank $c$, sieve $a'$, and cylinder $a$, as and for the purpose specified.

In testimony that I claim the above-described invention in improved flour-sifting machinery, I have hereunto signed my name this 25th day of February, 1873.

GEORGE PURPLE.

Witnesses:
FRANK H. BAUBIE,
M. F. TIRMAN.